No. 650,580. Patented May 29, 1900.
E. S. DUFFY.
PIPE COUPLING.
(Application filed Mar. 25, 1899.)

(No Model.)

Witnesses,
F. B. Mann,
Frederick G. Goodwin

Inventor,
Edward S. Duffy,
By Offield, Towle & Linthicum,
Attys.

THE NORRIS PETERS CO., PHOTO-LITHO., WASHINGTON, D. C.

UNITED STATES PATENT OFFICE.

EDWARD S. DUFFY, OF CHICAGO, ILLINOIS.

PIPE-COUPLING.

SPECIFICATION forming part of Letters Patent No. 650,580, dated May 29, 1900.

Application filed March 25, 1899. Serial No. 710,447. (No model.)

*To all whom it may concern:*

Be it known that I, EDWARD S. DUFFY, of Chicago, in the county of Cook and State of Illinois, have invented certain new and useful Improvements in Pipe-Couplings, of which the following is a specification.

This invention relates to pipe-couplings, and has for its object to provide a construction whereby a lead pipe or pipe of other soft metal which is not adapted to be threaded may be joined to an iron pipe or fitting or to a pipe or fitting of other comparatively-hard metal which is adapted to be threaded, so as to form a screw-joint.

My invention has for its object more particularly to provide a simple, strong, and inexpensive construction comprising a minimum number of parts and by means of which connections of the character described may be readily effected.

To these ends my invention consists in certain novel features which I will now proceed to describe and will then particularly point out in the claims.

Figure 1:
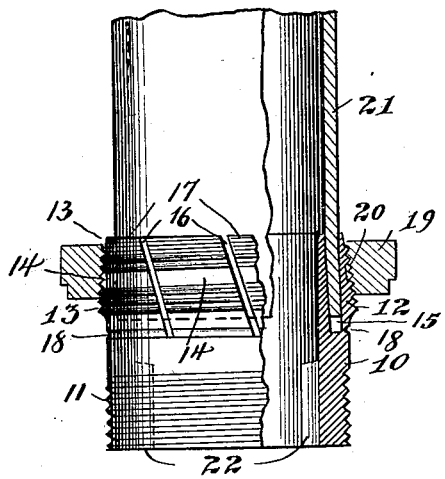
Figure 2:
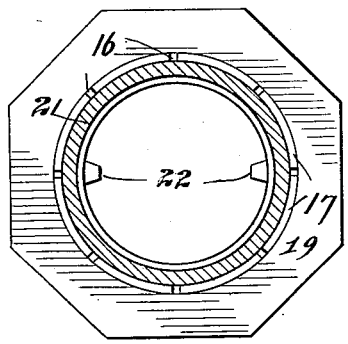

In the accompanying drawings, Figure 1 is an elevation, partly in section, of a structure embodying my invention; and Fig. 2 is a plan view of the same.

In carrying out my invention I employ a coupling comprising only two parts. The one part (indicated as a whole by the reference-numeral 10) consists of a sleeve or nipple, preferably constructed of brass or the like, and provided externally at one of its ends with a thread 11, by means of which it is adapted to be screwed into a correspondingly-threaded seat in a pipe or fixture of iron or other like material. At its other end the nipple is externally tapered or conical in shape, decreasing in diameter toward its extremity, this tapered or conical portion being indicated at 12 and being provided externally with a correspondingly-tapered screw-thread 13. For the reasons hereinafter stated I prefer to make this tapered screw-thread 13 in two separated portions, as shown in Fig. 1 of the drawings, a plain or unthreaded portion 14 intervening between the two threaded sections, as clearly shown in said figure. Within the body of the sleeve or nipple 10 and extending from that edge thereof at which the tapered surface 12 terminates inward a distance equal to or greater than the extent of said tapered portion is formed an annular seat or groove 15, which is substantially concentric with the body of the said sleeve or nipple. The inner wall of the said groove is preferably of increasing thickness as it recedes from the mouth of the groove for the purpose hereinafter set forth, while the outer wall, which comprises the tapered or conical portion 12, is divided by a plurality of slits 16 into a corresponding number of tongues 17. These slits are preferably inclined, as shown in the drawings, at approximately a right angle to the threads 13 and extend from the end of the sleeve or nipple 10 to about the bottom of the seat or groove 15, and in order to increase their elasticity I may provide at the base of the tongues thus formed a circumferential groove 18 in the body of the nipple.

The second member of the coupling consists of a nut 19, which is preferably polygonal in shape externally, so as to adapt it to receive a wrench, and which is internally tapered and threaded, as shown at 20, to conform to the tapered portion 12 of the sleeve or nipple and to fit upon the thread 13.

The lead or other pipe, which is indicated at 21, is adapted to be inserted within the groove or seat 15 before the nut 19 is screwed home, and in practice I propose to employ a series of fittings, each adapted to receive a particular size of pipe.

The coupling may be assembled in various ways; but in practice I prefer to first connect the sleeve or nipple 10 to the pipe or fitting to which it is intended to apply the same, and in order to facilitate the making of this connection I may provide said sleeve or nipple with internal lugs or projections 22, which are adapted to be engaged by a suitable instrument inserted through the slitted end of the sleeve or nipple and by means of which it may be screwed home into the pipe or fixture by the engagement of its thread 11 with the corresponding thread thereof. The nut 19 may then be slipped over the lead pipe 21, and this latter may be inserted into the annular groove or seat 15, and the tapering of the inner wall of said groove serves to insure a proper abutment for the end of the lead pipe in case its variations in thickness or diameter prevent it from extending sufficiently far into the groove or seat to permit it to abut squarely against the end thereof. The nut 19 is then moved forward into engagement with the threaded and tapered portion 12 of the sleeve or nipple, and by reason of the interruption of the thread 13 of said sleeve or nipple the said nut will engage said thread more readily and at two points simultaneously and there will be less tendency of the nut to bind upon the nipple or sleeve prematurely. By turning up the nut 19 the tongues 17, which constitute the outer wall of the groove or seat 15, may be forced inward firmly against the lead pipe 21, so as to clamp the same in position and make a water-tight joint, this clamping action being due to the taper of the body of the nipple at this point and the corresponding taper of the aperture in the nut. The tongues 17 are rendered more readily compressible by reason of the groove 18, which diminishes the thickness of the bodies of the tongues at their base, and the inclination of the slits 16 serves to better insure the proper engagement of the continuous threads of the nuts with the interrupted threads of the sleeve or nipple.

It will be observed that the coupling is simple in its construction, comprising only two component parts, and that by its means a connection of the kind hereinbefore pointed out may be readily and quickly effected and a water-tight joint produced. Moreover, since the portion of the sleeve or nipple upon which the nut screws is integral with said sleeve or nipple it cannot turn or slip relatively to the lead pipe, and a tight joint is thus insured without any danger of stripping the pipe.

I claim—

1. A pipe-coupling consisting of two parts, one an integral sleeve or nipple threaded at one end for connection to a pipe or fitting and having its other end externally tapered and threaded and provided with an annular concentric groove or seat adapted to receive the end of a lead pipe, the walls of said groove or seat presenting straight lines in section in a plane passing through the axis of the sleeve or nipple, the outer wall of said groove being slitted from the end of the nipple inward to form tongues, and the second a nut having an aperture tapered and threaded to fit upon the tapered and threaded portion of the sleeve, substantially as described.

2. A pipe-coupling consisting of two parts, one an integral sleeve or nipple threaded at one end for connection to a pipe or fitting and having at the other end an annular concentric groove or recess adapted to receive the end of a lead pipe, the walls of said groove or recess presenting straight lines in section in a plane passing through the axis of the sleeve, the outer wall of said groove or recess being provided with slits inclined to a plane passing through the axis of the sleeve and through the slit and extending from the end of the sleeve or nipple to the base of the groove or recess, said outer wall being tapered and threaded externally, and the second a nut having an aperture threaded and tapered to fit upon the threaded and tapered portion of the sleeve or nipple, substantially as described.

3. A pipe-coupling consisting of two parts, one an integral sleeve or nipple threaded at one end to connect to a pipe or fitting and provided at the other end with an annular concentric groove or seat adapted to receive the end of a lead pipe, the walls of said groove or seat presenting straight lines in section in a plane passing through the axis of the sleeve, the outer wall of said groove being slitted, as described, and being provided with an externally-tapered surface having separated threaded portions thereon, and a nut having an aperture correspondingly tapered and continuously threaded to fit upon the tapered and threaded portion of the sleeve or nipple, substantially as described.

EDWARD S. DUFFY.

Witnesses:
FREDERICK C. GOODWIN,
IRVINE MILLER.